Figure 3:
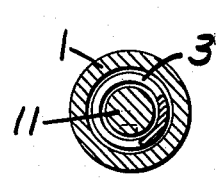

March 6, 1951     G. A. HENDERSON     2,544,158

HEAD SPACE GAUGE

Filed June 27, 1945

INVENTOR.
George Allen Henderson
BY
Reynolds Beach
ATTORNEYS.

Patented Mar. 6, 1951

2,544,158

UNITED STATES PATENT OFFICE 2,544,158

HEAD SPACE GAUGE

George Allen Henderson, Seattle, Wash.

Application June 27, 1945, Serial No. 601,775

7 Claims. (Cl. 33—143)

The present invention relates to headspace gauges for ordnance using fixed ammunition, whether that ordnance be a small arms piece, the chamber of which is closed by a movable bolt mechanism or the like, or be a larger piece, the breech of which is closed by breechblock mechanism. Hereinafter, where the bolt is referred to, it will be understood to imply any breech closure appropriate to the type of ordnance, whether a bolt, a breechblock, or other such closure.

In all instances of ordnance using fixed ammunition it is of extreme importance that the headspace be maintained within very narrow limits. This headspace can be measured only when the chamber of the piece is closed. The usual method of gauging the headspace has required the insertion of a gauge of fixed length into the chamber and the closing of the bolt to determine whether the gauge would fit in the chamber. The only adjustable gauge proposed prior to my invention of which I am aware is illustrated in the patent to Eickhoff and Tunks, No. 1,351,721 of August 31, 1920. This gauge requires adjustment in length by separable regulating means inserted through the muzzle of the piece. Such a method is inherently slow, because it requires the insertion of the gauge in the chamber, and the subsequent connection of the adjusting means to the gauge through the bore of the piece, and the reading can only be taken after the adjusting member has been withdrawn from the bore and the gauge is again exposed or removed by opening the chamber.

Accordingly, it is a primary object of the present invention to provide a gauge for the purpose indicated from which an accurate reading can be obtained merely by the process of inserting the gauge within the chamber, closing, and then immediately opening the chamber.

It is a further object to provide such a gauge which requires no member frictionally engageable within the chamber or the bore of the piece, but operable solely by contact of the bolt or a similar breech closure with one end, and of the shoulder with the other end of the gauge. Thereby is avoided the possibility of any scarring or marring of the bore's throat by frictional elements required to engage the bore to prevent rotation of the gauge while its adjustment to fit the chamber is being made and there is avoided any inaccuracy arising from variation in the frictional resistance of such holding means in different bores.

It is also an object to provide such a gauge which is readily adapted to factory adjustment to standard size, and which while capable of occasional adjustment in the field to accommodate wear, is readily guarded against the probability of maladjustment.

It is still a further object to provide a gauge of this nature which is simple, compact, and rugged.

With these and other objects in mind, as will appear hereafter, my invention comprises the novel gauge, and the novel parts and cooperative arrangement of such parts, all as shown in the accompanying drawings, described in this specification, and as will be more particularly defined by the claims.

In the accompanying drawings the gauge is shown in a presently preferred form, but it will be evident that various changes may be made in the form, character, and arrangement of the parts within the scope of the appended claims, and without departing from the spirit of my invention.

Figure 2:
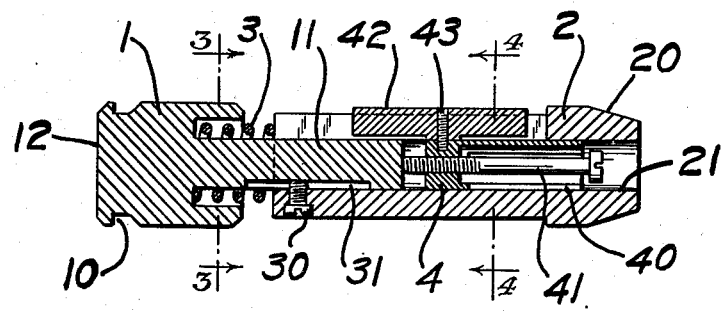
Figure 1:
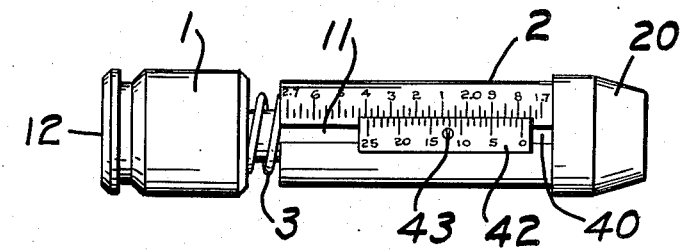

Figure 1 is an elevation of the gauge, and Figure 2 is an axial section therethrough, the viewpoint being 90° removed from that of Figure 1.

Figure 4:
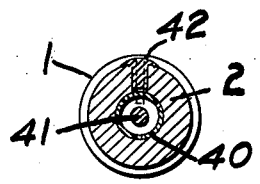

Figures 3 and 4 are cross sections on the respective lines 3—3 and 4—4 of Figure 2.

As will be understood, the gauge as a whole is formed to fit within the chamber of the piece which is to be gauged. Since the gauge illustrated is one such as may be used to gauge the headspace within the chamber of a normal army rifle, it is formed with a bolt-engaging member 1 having a head end 12 formed with a groove or flange 10 for engagement by the ejector, and generally the member 1 is shaped to correspond with the bolt-engaged end of a cartridge. It is also provided with a shoulder-engaging member 2, shaped at 20 to seat upon the shoulder of the chamber. These two members are relatively slidably mounted for contractile movement in opposition to resilient means, such as the spring 3, which urges them apart. It is largely immaterial whether it be the bolt-engaging member 1 that is provided with the stem 11 or the shoulder-engaging member 2. One member is conveniently provided with a stem, and the other with a bore 21, within which the stem is slidably received for relative axial movement between the members 1 and 2.

Since the spring 3 urges the two members apart it is desirable to provide means such as the set screw 30 received in the groove 31 to limit separation of the members.

Associated with one or the other of these members (and it is largely immaterial which) is a slide 4. This, in the embodiment illustrated, is of a size to fit snugly within the bore 21 of the shoulder-engaging member 2, and it is provided with a split sleeve 40 or other convenient means frictionally engaging within the bore 21 to retain the sleeve in any set position, but to permit it to slide when desired. It will be obvious that the arrangement described is only one means of accomplishing the intended result, which is that the slide 4 shall slide relatively freely upon application of force, and yet be retained in any attained position against further movement when such force is removed.

The slide 4 is mounted in the member 2 in this instance, and its movement relative to such slide mounting member is accomplished by its engagement by the other member 1, or by the stem 11 thereof. Preferably the engagement is indirect, through the medium of an adjusting screw 41, which is the means for accomplishing the initial or factory adjustment, or the adjustment for wear. During normal usage of the gauge the adjusting screw 41 is not employed, and may be fixed by a drop of solder or by a set screw to the slide 4, so that in effect it becomes an integral or fixed part of the slide.

Cooperating between the slide 4 and the slide-mounting member 2 are index and scale markings. For convenience of assembly a scale member 42 is secured to the slide 4 by means of a screw 43; the scale member 42 is provided with index marks constituting a vernier scale, and the slide mounting member 2, in a central reduced portion, is provided with cooperating scale markings, all as best shown in Figure 1. The reading there shown is 1.780", which may indicate a reading taken during an intermediate stage in the manufacture of the rifle. Readings can be taken in thousandths of an inch.

At the factory, or occasionally as wear occurs in the gauge in the field, the gauge parts 1 and 2 can be set to a standard separation between the bolt-engaging end 12 and the shoulder-engaging end 20, and the scale and index adjusted to the corresponding reading by means of the adjusting screw 41, which, after such occasional adjustment, is preferably set semi-permanently in adjusted position, as already described. It is immaterial whether the scale read in terms of the length of the chamber, which in the final analysis is what is being measured, or in terms of headspace, which is the excess in length of the chamber over the length of the cartridge.

With the gauge thus made ready for use, to measure headspace the slide 4 is pushed to the left, as viewed in Figure 2; the spring 3 will have moved the stem 11 out of the way of the slide 4. Now the gauge is inserted in the chamber, and the bolt is pressed home, and locked. In so doing the closure of the bolt presses the member 1 toward the member 2, in opposition to the spring 3, and the stem 11 engages the slide 4, or the projecting end of the screw 41, which in effect is part of the slide, and urges the slide to the right. Such movement stops when the bolt is closed and locked. The bolt is then withdrawn and the gauge is thereby exposed or ejected. While the spring 3 will urge the member 1 away from the member 2, the slide 4 will still remain in its adjusted or attained position relative to the slide bearing member 2, and the scale markings will show the attained position of the slide. It is therefore possible to read exactly the size of the chamber or, in relation thereto, the amount of headspace. This process can be repeated as rapidly as the gauge can be inserted into each chamber and withdrawn therefrom, and therefore offers a very rapid means of gauging accurately the headspace of any type of piece, for the gauge can be made of a size to fit any desired chamber.

I claim as my invention:

1. An ordnance headspace gauge comprising a bolt-engaged member and a shoulder-engaging member cooperatively formed to fit wholly and bodily within the closed chamber of the ordnance piece, and relatively movable axially of the chamber by closing pressure of the bolt, and a slide mounted for axial sliding movement by one of said members and engaged for such sliding movement by the other member during bolt-induced relative axial approach of the two members, the slide and the slide-mounting member bearing cooperating scale and index marks to indicate the chamber's headspace.

2. An ordnance headspace gauge comprising a bolt-engaged member and a shoulder-engaging member cooperatively formed to fit wholly and bodily within the closed chamber of the ordnance piece, and relatively contractile axially of the chamber by closing pressure of the bolt, means extending circumferentially of the bolt-engaged member for engagement by the piece's ejector, a slide engageable by one of said members and mounted for axial sliding movement relative to the other member under the influence of bolt-induced relative axial approach of the two members, and frictional means to retain the slide and the slide-mounting member in attained relative axial position, the slide and the slide-mounting member bearing cooperating scale and index marks to indicate the chamber's headspace as thus determined.

3. An ordnance headspace gauge comprising two members interengaged for relative longitudinal sliding movement, one formed to engage the shoulder of the chamber of an ordnance piece, and the other to be engaged and shifted axially, to contract the over-all length of the gauge, by the closing pressure of the bolt of such piece, the two members then cooperating to fill the entire length of the chamber, resilient means resisting such contractile movement, a slide engageable by one of said members and mounted upon and for sliding movement relative to the other member by bolt-induced relative axial approach of the two members, and frictional means to retain the slide and the slide-mounting member in attained relative position, the slide and the slide-mounting member bearing cooperating scale and index marks to indicate the chamber's headspace as thus determined.

4. An ordnance headspace gauge comprising two members interengaged for relative longitudinal sliding movement, one formed to engage the shoulder of the chamber of an ordnance piece, and the other to be engaged and shifted axially by the closing pressure of the bolt of such piece, the two members then cooperating to fill the entire length of the chamber, a slide engageable by one of said members and mounted upon and for sliding movement relative to the other member by bolt-induced relative axial movement of the two members, frictional means to retain the slide and the slide-mounting member in attained relative position, the slide and the slide-mounting member bearing cooperating scale and index marks to indicate the chamber's headspace as thus determined, and an adjusting screw threaded in one of said slide and said slide-engaging member and engaging the other thereof to space the two apart, by its adjustment serving to adjust the scale and index marks to standard reading when the gauge is disposed within a standard chamber.

5. An ordnance headspace gauge comprising a bolt-engaged member having a forwardly projecting stem, a shoulder-engaging member bored to receive said stem, the two members being cooperatively formed to fit within the piece's chamber, and being relatively axially movable by closing pressure of the bolt, resilient means urging the two members apart, a slide including a friction sleeve slidably received within said bore of the shoulder-engaging member, said slide being engageable by the stem of the other member for sliding in one direction during bolt-induced relative axial approach of said members, and said slide and the slide-bearing member bearing cooperative index and scale markings to designate the headspace as thus determined.

6. An ordnance headspace gauge comprising a bolt-engaged member having a forwardly projecting stem, a shoulder-engaging member bored to receive said stem, the two members being cooperatively formed to fit within the piece's chamber, and being relatively axially movable by closing pressure of the bolt, resilient means urging the two members apart, a slide including a friction sleeve slidably received within said bore of the shoulder-engaging member, an adjusting screw interposed between the slide and said stem, and when engaged by the stem effecting corresponding sliding movement of the slide relative to the slide-bearing member during bolt-induced relative axial approach of said members, and said slide and slide-bearing member carrying cooperative index and scale markings to designate the headspace as thus determined.

7. A headspace gauge for an ordnance piece, which piece includes a chamber admitting to the bore, and having a shoulder adjacent the bore, and a bolt movable towards said shoulder as it moves from open towards closed position, said gauge comprising a bolt-engaged member and a shoulder-engaging member cooperatively formed to fit wholly and bodily within the closed chamber, and relatively movable axially of the chamber under the influence of closing pressure of the bolt, and a slide mounted by one of said members for axial sliding movement and engaged to be so slid by the other member during relative approach of the two members induced by closing movement of the bolt, the slide and the slide-mounting member bearing cooperating scale and index marks to indicate the chamber's headspace.

GEORGE ALLEN HENDERSON.

REFERENCES CITED

The following references are of record in the file of this patent:

UNITED STATES PATENTS

| Number | Name | Date |
|---|---|---|
| 302,069 | Waterman | July 15, 1884 |
| 514,685 | Reber | Feb. 13, 1894 |
| 1,161,765 | Dunbar | Nov. 23, 1915 |
| 1,231,934 | Packet | July 3, 1917 |
| 1,342,288 | Ichiba | June 1, 1920 |
| 1,351,721 | Eickhoff et al. | Aug. 31, 1920 |
| 2,352,313 | Fernald | June 27, 1944 |

FOREIGN PATENTS

| Number | Country | Date |
|---|---|---|
| 196,282 | Great Britain | Jan. 10, 1924 |
| 380,322 | France | Oct. 4, 1907 |
| 738,779 | France | Oct. 18, 1932 |